Oct. 12, 1926.

P. M. J. BOUCHEROT

HIGH FREQUENCY ALTERNATOR

Filed August 29, 1921

1,603,230

Inventor
P.M.J. BOUCHEROT
By his Attorney

Patented Oct. 12, 1926.

1,603,230

UNITED STATES PATENT OFFICE.

PAUL MARIE JOACHIM BOUCHEROT, OF PARIS, FRANCE.

HIGH-FREQUENCY ALTERNATOR.

Application filed August 29, 1921, Serial No. 496,693, and in France October 1, 1915.

The present invention relates to alternators arranged to produce high frequency currents.

The difficulties encountered in producing high frequency currents with the usual alternators may be enumerated as follows:

(1) At the periphery of an annular rotor carrying pole pieces provided with windings, the linear speed cannot exceed 150–200 metres per second. With a polar pitch of .7 to 8 millimetres which causes already considerable magnetic leakage between the poles, such speed would give 10,000 to 20,000 periods per second as the frequency that may be realized, the harmonics which may be developed by any desired means being eliminated. If it is desired to exceed this frequency, the magnetic leakage will be prohibitively great and due to this the power obtained will rapidly diminish.

(2) If the frequency is increased, it will be necessary to reduce the section of the armature conductors, both in parallel and perpendicular direction of the magnetic lines of force. The reduction in the perpendicular direction has little influence on the power if the induction in the teeth is maintained constant, because it is partially compensated by the increase of the electromotive force. But this does not hold good for the other reduction and for this reason the power will rapidly diminish when the frequency is increased.

(3) The sheet iron laminations that must be used for very high frequencies will be very thin. The thinnest laminations thus far produced have a thickness of 3 to 5 hundredths of a millimetre. Calculations show that, in order to eliminate the harmful effects of the Foucault currents, the frequency of 20,000 periods per second must not be exceeded and that even in this case, the losses caused by hysteresis are excessive if the induction is not reduced.

(4) Finally, the magnetic attraction between the stator and the rotor prevents the use of a sufficiently flexible shaft, because the air gap is very small. Also among the considerable difficulties of a mechanical nature that are met with in the construction of machines revolving at high angular rates of speed, those due to the existence of critical speeds must be especially considered. Critical speeds are certain rates of speed for which the elastic forces corresponding to the deformations exactly compensate the forces of inertia corresponding to the same deformation, and for which, as a consequence, what is known as mechanical resonance arises. Inasmuch as there are, as a general rule, several kinds of possible deformation there exist several critical speeds; for instance, the first critical speed is generally the speed which corresponds to the deformation through simple flexion of the shaft or arbor rested and supported in its bearings.

When working exactly at one of these critical speeds, unless there is some resistance for compensating the disturbance which is due to the rotation of the center of gravity about the center of rotation, dangerous vibrations may result leading to the breakage of the shaft. Such resistances are sometimes found either in the form of internal frictions or in external frictions relative to the material of the shaft, or else in gyrostatic effects. It is, however, also feasible to avoid the breaking of shafts by rapidly changing the speed, that is by passing rapidly through the critical speed, in order that the resonance may not find time sufficient to accumulate effects.

In the present application, the proposition is made to provide the resistance forces above referred to in the shape of electromagnetic forces set up inside certain pieces integral with the shaft, by utilizing for this purpose a magnetic flux which is found in existence and naturally exists in the case of alternators as will appear from the specification.

The present invention has to do with the application of certain devices to a well known type of alternator which is seldom used for usual frequencies but which is particularly adapted for producing high frequency currents. By means of such devices, the above mentioned difficulties are avoided.

Of such type is the homopolar or undulating flux alternator. By means of such an alternator, high speed may be attained because it has no movable windings and even higher frequencies may be attained because the alternator has only one pole piece per period. There is no magnetic leakage between two pole-pieces whereby the pole pieces may be made very thin and may be located close to one another.

The accompanying drawing shows the application of the improvements in constituting the invention to an alternator adapted to produce frequencies of 100,000 or more periods per second.

Figure 1:
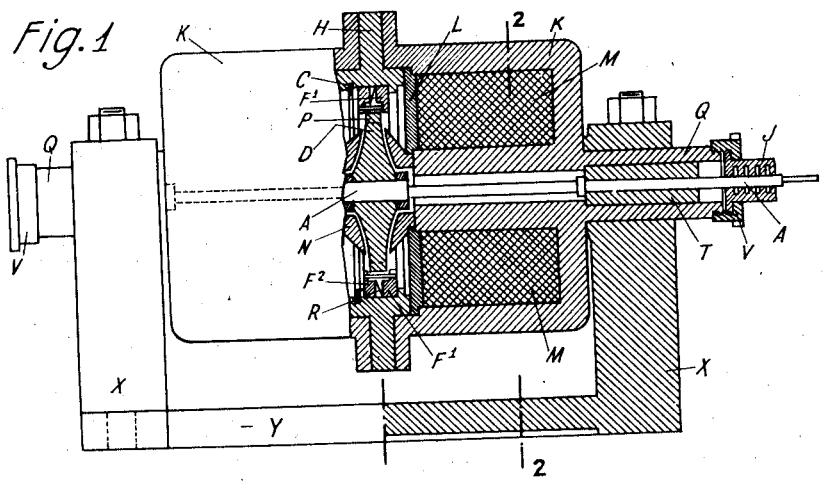
Fig. 1 is a side view, the right hand portion being shown in a vertical section displaying the shaft.
Figure 2:
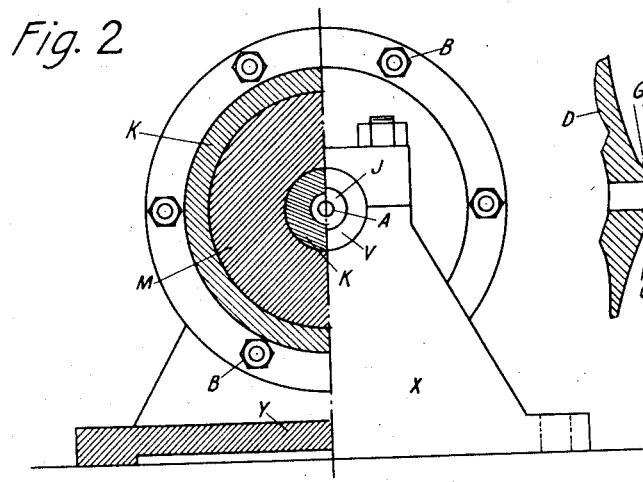
Fig. 2 is an end view, the left hand portion being a section along lines 2—2 of Fig. 1.

The rotor comprises a magnetic steel disc D of great strength, thickened at its center for reducing the molecular tension and provided with very long teeth P of the same metal. The disc is mounted on a flexible shaft A.

The armature consists solely of a winding E, zigzag or undulated, of copper laminations or of wires soldered together to constitute the equivalent of a lamination. This winding is supported at a distance from the masses of metal in the machine by projections S on two iron rings $F^1$ and $F^2$, of high heat conductivity, which are attached to a third iron or steel ring H, likewise of high heat conductivity. The drawing represents a very small machine in which the winding is insulated merely by enameling the projections S. The ring $F^1$ is permanently attached to H, but the ring $F^2$ may slide in parallel with the shaft and a spring R of the type called Belleville ring, insures the continuous tensioning of the conductors in the winding when they become slightly heated. A circular stop C limits the movement of the ring $F^2$.

The ring H carrying the armature assembly is connected to each field magnet K by means of bolts B. An extension piece N of any suitable shape insures the passage of the magnetic flux from the field magnet K, to which it is attached, into the disc D of the rotor. Each field magnet K comprises a magnetizing winding M completely enclosed within the field magnet K by means of a brass casing L soldered to the field magnet.

Each field magnet carries a cylindrical projection Q provided with a recess having the bearing surface T for the rotor; the outer surface of projection Q forms a bearing surface for the stator. By means of a joint J on the side where the shaft is prolonged to receive the movement, and two caps V, the space containing the rotor and the field magnet is kept air-tight and a partial vacuum will be produced in this space by any well known means in order to reduce the air friction. The projections Q are supported by cast iron supports X interconnected by a base Y.

The purpose of this last mentioned arrangement is to prevent the whole machine being torn away from the ground or thrown by the relatively considerable force in case the shaft A or the disc D breaks or in any manner comes in contact with the stator. Normally, the moderate pressure of projection Q on the supports X prevents the movement of the stator due to the reaction between rotor and stator. But in the case of a breakage, the stator will be moved in the same direction as the rotor due to the friction of the latter.

In order to avoid a conflicting drawing various grease cups, air conducting tubes, and oil removing tubes, have not been illustrated.

The rotor has the form of a tapered disc having elongated pole projections which are much longer than would be necessary if they were decided upon merely from a magnetic point of view. Due to this arrangement, which cuts down the mass of metal at the periphery of the rotor, a peripheral speed is permissible which is at least twice that of the normally safe limit of speed.

The armature contains no sheet iron and the large air gap provided around the rotor insures that, in case of a temporary eccentricity of the latter, the resultants of the magnetic force exerted on the rotor cannot increase the eccentricity. In other words, the system of mechanic and magnetic forces is stable and this would not be the case if, as is usual, the windings E were located in the iron sheets.

Due to the disclosed arrangement, there is a further influence that tends to increase this stability. It is the influence of the Foucault currents which are developed in the conductors E by the passage of the poles. On the side where the poles approach, the Foucault currents increase and the repulsion increases and counteracts the eccentricity.

On these Foucault currents developed in a plane perpendicular to the directions of the poles, other currents are superposed in the planes parallel to these directions. The last mentioned currents result from the electromotive forces due to the spreading out of the flux and their effect is to oppose this spreading out and to distribute somehow this flux among the conductors. The density of the current issuing from the armature must have a rather high value, and if a reasonably great power is to be obtained from the machine, a considerable heating of the armature conductors must be expected.

In order to prevent this heating, means may be provided for projecting a fine spray of water on these conductors. This water will be evaporated and discharged in a semi-liquid, semi-gaseous form by the suction of the air. Notwithstanding the partial vacuum the rotor might become heated as a result of the air friction. For this reason, a part of this water could be projected against the disc which would cause the spraying (pulverization) thereof. If it is desired to do away with special spraying means, all the water may be discharged on the shaft or the disc.

Figure 3:
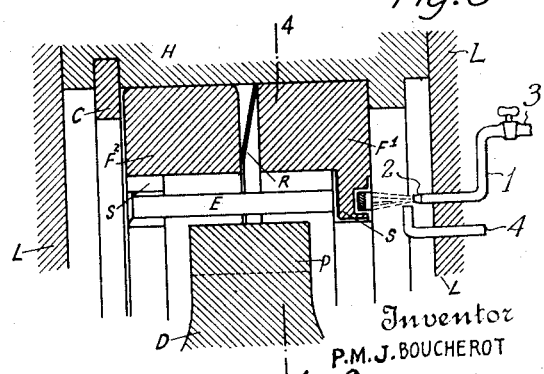
Fig. 3 is a larger scale representation of one of the details of Fig. 1.

This arrangement is illustrated in Fig. 3 wherein 1 is a tube connecting with the outside atmosphere and provided with a cock 3 for the purpose of opening or closing this tube. The tube 1 is provided with a tapered outlet within the casing K of the machine and adjacent to this outlet 2 is provided another tube 4 connected to a tank (not shown) containing some suitable volatile liquid for cooling. The arrangement is such that when cock 3 is open the winding will be sprayed by a cooling liquid from the tube 4.

Any other volatile liquid may be used for cooling in place of water. The same liquid may be used for lubricating the bearings and for cooling.

Figure 5:
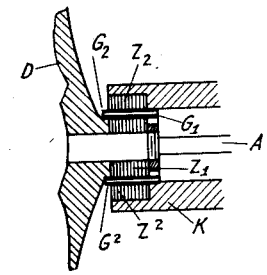
Fig. 5 is a sectional view of a modified detail.
Figure 4:
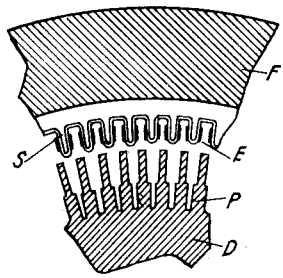
Fig. 4 is a sectional view along lines 4—4 of Fig. 3.

In the arrangements herein disclosed, apparently no attention is paid to the difficulties due to the revolution of the flexible shaft at the critical speeds when the machine is started or stopped. As a matter of fact, we have counted on the dampening of the vibrations by the Foucault currents which are developed in the spread out portion N and the disc D by the variations of the flux. The machine is not energized prior to its starting. The modification shown in Fig. 5 may also be used. On each side of the disc D insulated sheet iron washers $Z^1$ are provided and a copper or other metal tube $G^1$ is forced on these washers. Each spread out piece N is replaced by the insulated sheet iron washers $Z^2$, within which is forced a copper or other metal tube $G^2$. In order to pass from K to D, the flux must traverse the air gap comprised between $Z^1$ and $Z^2$, and if there are vibrations, the Foucault currents which are developed in $G^1$ and $G^2$ have a more efficacious action than in the case of the arrangement shown in Fig. 1. This arrangement may be useful irrespective of the origin of the vibrations.

Having described my invention, what I claim is:—

1. In a homopolar alternator for generating high frequency currents, a rotor and a stator and means cooperating therewith for producing eddy currents when displacements occur between said parts due to vibrations of any origin.

2. In a homopolar radio frequency alternator, the combination of a rotor, a stator and means for opposing deformation of said rotor, said means comprising a winding supported in a manner to have eddy currents induced therein as a result of the deformation of said stator.

3. In an alternator, a stator, a rotor mounted and arranged for predetermined rotational relationship with said stator, and means for opposing changes in said rotational relationship, comprising a winding mounted on one of said parts and arranged to have eddy currents induced therein as a result of the variations from said predetermined relationship whereby to oppose such variations.

4. The combination with a stator and a rotor arranged to occupy predetermined positions in relation to said stator of means responsive to eddy current for substantially preventing the deviation from said predetermined positions.

5. The combination with a stator and a rotor arranged to occupy predetermined positions in relation to said stator of electric conducting means mounted on said stator or rotor and responsive to eddy currents caused by a slight variation of said rotor from said predetermined positions for preventing a substantial deviation from said predetermined positions.

6. The combination with a stator and a rotor arranged to occupy predetermined positions in relation to said stator of an electrical winding mounted on said stator and arranged to have eddy currents induced in it as a result of minor deviations of said rotor from said predetermined positions for preventing a substantial deviation from said predetermined positions.

7. The combination with a stator and a rotor arranged to occupy predetermined positions in relation to said stator of a winding arranged to supply energy to an external circuit and to have eddy currents induced in it in response to small deviations from said predetermined positions to thereby prevent substantial deviations from said predetermined positions.

8. The combination with a stator, a rotor mounted and arranged for predetermined rotational relationship with said stator of means for opposing changes in said rotational relationship comprising a winding mounted on one of said parts and arranged to have eddy currents induced therein as a result of variations from said predetermined relationship whereby to oppose such variations, said winding in addition being arranged to supply an external load circuit.

9. In a high frequency alternator, a rotor and a stator, a bearing for said rotor and a bearing for said stator, said last named bearing having sufficient friction to normally prevent rotation of said stator but permitting it to rotate with the rotor when the latter comes into contact therewith.

10. In an alternator, an armature, a winding thereon, means for supporting the winding conductors at a plurality of isolated points and means for causing relative movement between adjacent supports to maintain substantially constant tension in said conductors at different temperatures.

11. In an alternator, an armature, a winding thereon, means for supporting the winding conductors at a plurality of isolated points and in spaced relationship to the metal portions of the armature and resilient means for causing relative movement between adjacent supports to compensate for changes in length in said conductors and maintain the tension therein substantially constant at varying temperatures.

PAUL MARIE JOACHIM BOUCHEROT.